United States Patent
Bachman et al.

(10) Patent No.: US 8,726,670 B2
(45) Date of Patent: May 20, 2014

(54) EJECTOR PURGE OF CAVITY ADJACENT EXHAUST FLOWPATH

(75) Inventors: Frank Gerald Bachman, Maineville, OH (US); Randy Lee Lewis, Lebanon, OH (US); Robert Steven Bockwich, Montgomery, OH (US); Shane Bunnag, Los Angeles, CA (US)

(73) Assignee: General Electric Company, Schenectady, NY (US)

( * ) Notice: Subject to any disclaimer, the term of this patent is extended or adjusted under 35 U.S.C. 154(b) by 1243 days.

(21) Appl. No.: 12/822,519

(22) Filed: Jun. 24, 2010

(65) Prior Publication Data

US 2011/0315789 A1    Dec. 29, 2011

(51) Int. Cl.
*F02K 3/10* (2006.01)

(52) U.S. Cl.
USPC ...... 60/766; 60/762; 239/265.17; 239/265.19

(58) Field of Classification Search
USPC ........... 60/231, 762, 766; 239/265.17, 265.19
See application file for complete search history.

(56) References Cited

U.S. PATENT DOCUMENTS

| | | | | |
|---|---|---|---|---|
| 4,109,864 A * | 8/1978 | Clayton | | 239/127.3 |
| 4,271,666 A | 6/1981 | Hurley et al. | | |
| 4,817,378 A * | 4/1989 | Giffin et al. | | 60/762 |
| 5,070,690 A * | 12/1991 | Mayer | | 60/762 |
| 5,265,408 A | 11/1993 | Sheoran et al. | | |
| 5,343,697 A * | 9/1994 | Johnson et al. | | 60/226.3 |
| 5,396,763 A * | 3/1995 | Mayer et al. | | 60/765 |
| 5,400,589 A * | 3/1995 | Mahias et al. | | 60/762 |
| 5,813,221 A * | 9/1998 | Geiser et al. | | 60/762 |
| 5,996,936 A * | 12/1999 | Mueller | | 244/53 R |
| 6,021,637 A * | 2/2000 | Scavo | | 60/262 |
| 6,668,541 B2 * | 12/2003 | Rice et al. | | 60/207 |
| 6,976,361 B1 * | 12/2005 | Cortes et al. | | 60/762 |
| 7,225,623 B2 | 6/2007 | Koshoffer | | |
| 7,437,876 B2 * | 10/2008 | Koshoffer | | 60/776 |
| 7,467,518 B1 * | 12/2008 | Vermeersch | | 60/766 |
| 7,467,519 B2 | 12/2008 | Raybold | | |
| 7,578,369 B2 | 8/2009 | Francisco et al. | | |
| 7,870,740 B2 * | 1/2011 | Bunel et al. | | 60/766 |
| 7,966,823 B2 * | 6/2011 | Koshoffer et al. | | 60/766 |
| 8,011,188 B2 * | 9/2011 | Woltmann et al. | | 60/766 |
| 8,201,413 B2 * | 6/2012 | Lavin et al. | | 60/766 |
| 2007/0044476 A1 | 3/2007 | Koshoffer | | |
| 2007/0157621 A1 | 7/2007 | Koshoffer et al. | | |
| 2008/0016871 A1 * | 1/2008 | Lavin et al. | | 60/766 |
| 2008/0245062 A1 | 10/2008 | Dionne | | |
| 2009/0056340 A1 * | 3/2009 | Woltmann et al. | | 60/766 |

* cited by examiner

*Primary Examiner* — Ehud Gartenberg
*Assistant Examiner* — Lorne Meade
(74) *Attorney, Agent, or Firm* — General Electric Company; Steven J. Rosen (57) ABSTRACT

A gas turbine engine augmentor includes an inter-liner cavity including an axially extending annular gap separating augmentor and tailpipe liners. A purge flow cavity is in fluid communication with a fan bypass duct and with the cavity. An ejector in fluid communication with the bypass duct includes an ejector nozzle positioned and aimed to direct an ejector nozzle flow from inside the ejector nozzle across the cavity. The purge flow cavity may be bifurcated into forward and aft purge flow cavities which are in fluid communication with the ejector and inter-liner cavity respectively. An annular dividing wall having ejector metering apertures may be disposed between the forward purge flow cavity and an ejector plenum of the ejector. An annular trapped vortex cavity pilot may be located upstream of the annular gap. The aft purge flow cavity may be outwardly bounded by a seal having purge metering apertures disposed therethrough.

17 Claims, 6 Drawing Sheets

FIG. 6 ously expended. Thrust augmentation of the invention reduces combustor distress, which has been used during reheat operation primarily for supersonic flight.

EJECTOR PURGE OF CAVITY ADJACENT EXHAUST FLOWPATH

The Government has rights to this invention pursuant to Contract No. N00019-04-C-0093 awarded by the United States Department of Defense.

BACKGROUND OF THE INVENTION

The present invention relates generally to aircraft gas turbine engines with cooling cavities adjacent an exhaust flowpath of the engine downstream of an afterburner and, more specifically, downstream of an afterburner with a trapped vortex cavity.

High performance military aircraft typically include a turbofan gas turbine engine having an afterburner or augmentor for providing additional thrust when desired particularly for supersonic flight. The turbofan engine includes in downstream serial flow communication, a multistage fan, a multistage compressor, a combustor, a high pressure turbine powering the compressor, and a low pressure turbine powering the fan. A bypass duct surrounds and allows a portion of the fan air to bypass the multistage compressor, combustor, high pressure, and low pressure turbine.

During operation, air is compressed in turn through the fan and compressor and mixed with fuel in the combustor and ignited for generating hot combustion gases which flow downstream through the turbine stages which extract energy therefrom. The hot core gases are then discharged into an exhaust section of the engine which includes an afterburner from which they are discharged from the engine through a variable area exhaust nozzle.

Afterburners are located in exhaust sections of engines which includes an exhaust casing and an exhaust liner circumscribing a combustion zone. Fuel injectors (such as spraybars) and flameholders are mounted between the turbines and the exhaust nozzle for injecting additional fuel when desired during reheat operation for burning in the afterburner for producing additional thrust. Thrust augmentation or reheat using such fuel injection is referred to as wet operation while operating dry refers to not using the thrust augmentation. The annular bypass duct extends from the fan to the afterburner for bypassing a portion of the fan air around the core engine to the afterburner. This bypass air is mixed with the core gases and fuel from the spraybars, ignited, and combusted prior to discharge through the exhaust nozzle. The bypass air is also used in part for cooling the exhaust liner.

Various types of flameholders are known and provide local low velocity recirculation and stagnation regions therebehind, in regions of otherwise high velocity core gases, for sustaining and stabilizing combustion during reheat operation. Since the core gases are the product of combustion in the core engine, they are initially hot, and are further heated when burned with the bypass air and additional fuel during reheat operation. Augmentors currently are used to maximize thrust increases and tend to be full stream and consume all available oxygen in the combustion process yielding high augmentation ratios for example about 70%.

In regions immediately downstream of the flameholder, the gas flow is partially recirculated and the velocity is less than the rate of flame propagation. In these regions, there will be a stable flame existing which can ignite new fuel as it passes. Unfortunately, flameholders in the gas stream inherently cause flow losses and reduced engine efficiency. Several modern gas turbine engines and designs include radially extending spraybars and flameholders in an effort to improve flame stability and reduce the flow losses. Radial spraybars integrated with radial flameholders are disclosed in U.S. Pat. Nos. 5,396,763 and 5,813,221. Radial spraybars disposed between radial flameholders having integrated radial spraybars have been incorporated in the GE F414 and GE F110-132 aircraft gas turbine engines. This arrangement provides additional dispersion of the fuel for more efficient combustion and unload fueling of the radial flameholders with the integrated radial spraybars so that they do not blowout and/or have unstable combustion due to excess fueling.

Since fuel is typically injected upstream of the flameholders, undesirable auto-ignition of the fuel and combustion which might occur upstream of the flameholders causes flameholder distress which also significantly reduces the useful life of the flameholders. Since V-gutter flameholders are suspended within the core gases, they are more difficult to effectively cool and, typically, experience circumferential variation in temperature, which correspondingly effects thermal stress, which also decreases the useful life thereof. V-gutter flameholders have limited flameholding capability and their aerodynamic performance and characteristics negatively impact the size, performance, and thrust capability of the engine. This is, in part, due to the combustion zone having sufficient length to allow substantially complete combustion of the fuel added by the spraybars prior to discharge through the nozzle and wide ranging flight speeds and Mach numbers. Flame stabilizing trapped vortex cavity pilots have been developed to provide better performance characteristics than previous afterburners or augmentors with lower flow losses and improved engine efficiency. Internally and externally fueled annular trapped vortex cavity pilots have a cavity opening open to an exhaust flowpath. See U.S. Pat. No. 7,225,623 entitled "Trapped Vortex Cavity Afterburner", U.S. Pat. No. 7,467,518 entitled "Externally Fueled Trapped Vortex Cavity Augmentor", and US Patent Publication No. 2009/0056340A1 entitled "Augmentor With Trapped Vortex Cavity Pilot", now U.S. Pat. No. 8,011,188.

Between the exhaust nozzle and the trapped vortex cavity pilot is the exhaust casing and exhaust liner circumscribing the combustion zone. The trapped vortex cavity may be formed in a trapped vortex liner upstream and separate from the exhaust liner, thus, forming a cavity between the two liners. It is important to purge this cavity because it can cause flow separation and therefore create a flame-holding region and burning of the liners in this area which can lead to premature wear or failure and can pose a flight safety hazard. Thus, it is highly desirable to provide a good cavity purge to prevent burning in the area of the cavity.

BRIEF DESCRIPTION OF THE INVENTION

A gas turbine engine augmentor includes an inter-liner cavity including an axially extending annular gap separating augmentor and tailpipe liners. A purge flow cavity is radially outwardly open to and in fluid communication with a fan bypass duct and radially inwardly open to and in fluid communication with the inter-liner cavity. An ejector is in fluid communication with the fan bypass duct and includes an ejector nozzle positioned and aimed to direct an ejector nozzle flow from inside the ejector nozzle across the inter-liner cavity.

An exemplary embodiment of the ejector includes an ejector plenum in fluid communication with the fan bypass duct and the ejector nozzle has a nozzle flowpath therein that extends and converges aftwardly between an ejector nozzle inlet to an ejector nozzle outlet. The ejector nozzle inlet is open to and in fluid communication with the ejector plenum and the ejector nozzle outlet. The purge flow cavity may be bifurcated into forward and aft purge flow cavities open to and in fluid communication with the fan bypass duct, the ejector plenum located radially inwardly of and in fluid communication with the forward purge flow cavity, and the aft purge flow cavity located radially outwardly of and in fluid communication with inter-liner cavity. An annular dividing wall having ejector metering apertures between the forward purge flow cavity and the ejector plenum.

The ejector nozzle outlet may be positioned and aimed to further direct the ejector nozzle flow at a forward facing step at an upstream end of the tailpipe liner bordering the annular gap.

A U-shaped wall formed at an aft or downstream end of a bifurcating duct wall bifurcating the annular bypass duct into annular radially outer and inner fan ducts may be use to bifurcate the purge flow cavity into the forward and aft purge flow cavities. The forward and aft purge flow cavities are then open to and in fluid communication with the outer fan duct of the fan bypass duct.

The augmentor may also include an annular trapped vortex cavity pilot located upstream of the annular gap and operable for initiating and propagating a flame around in a combustion zone in the exhaust flowpath within the augmentor liner.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
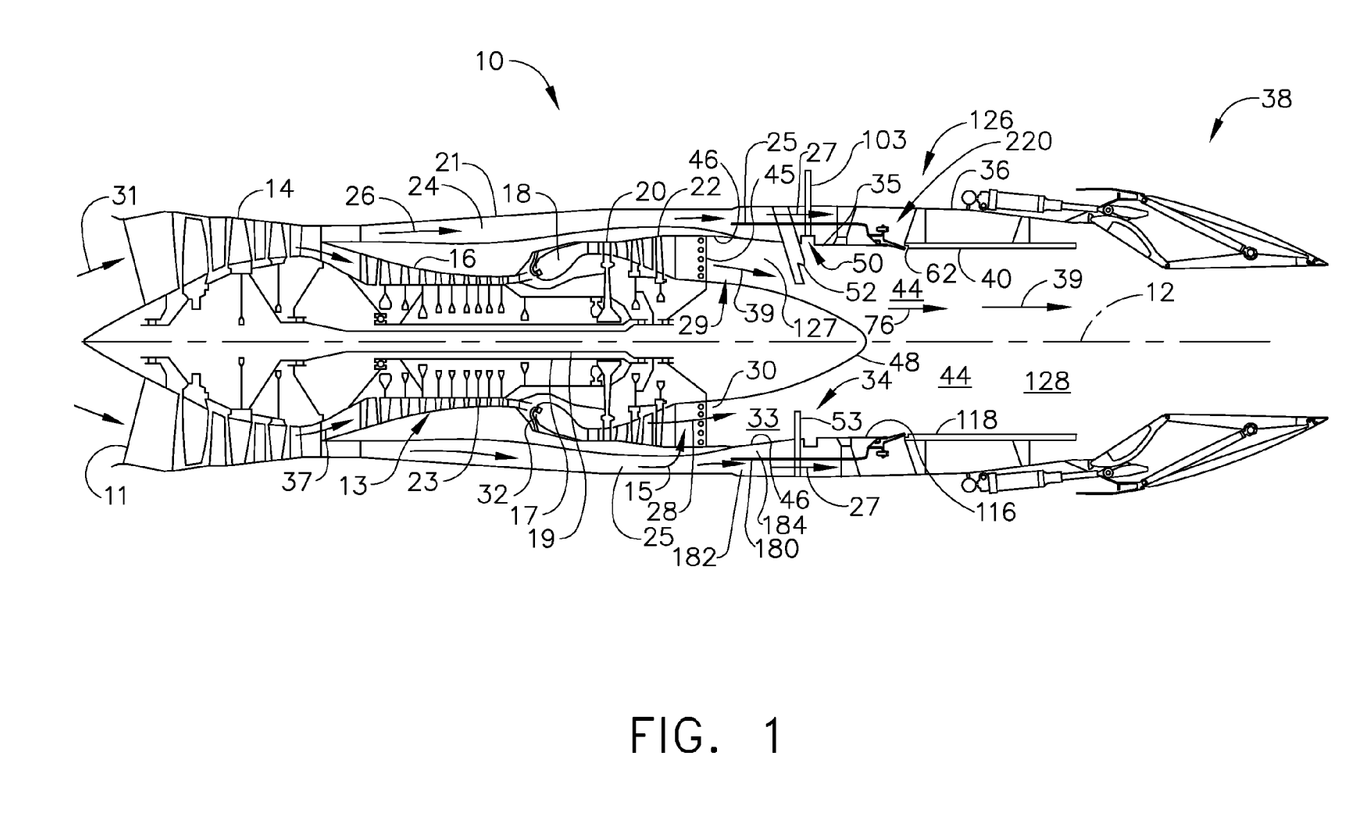
FIG. 1 is an axial sectional view illustration through an exemplary turbofan gas turbine engine having an augmentor with a trapped vortex cavity pilot and an ejector and cavity purge assembly.
Figure 2:
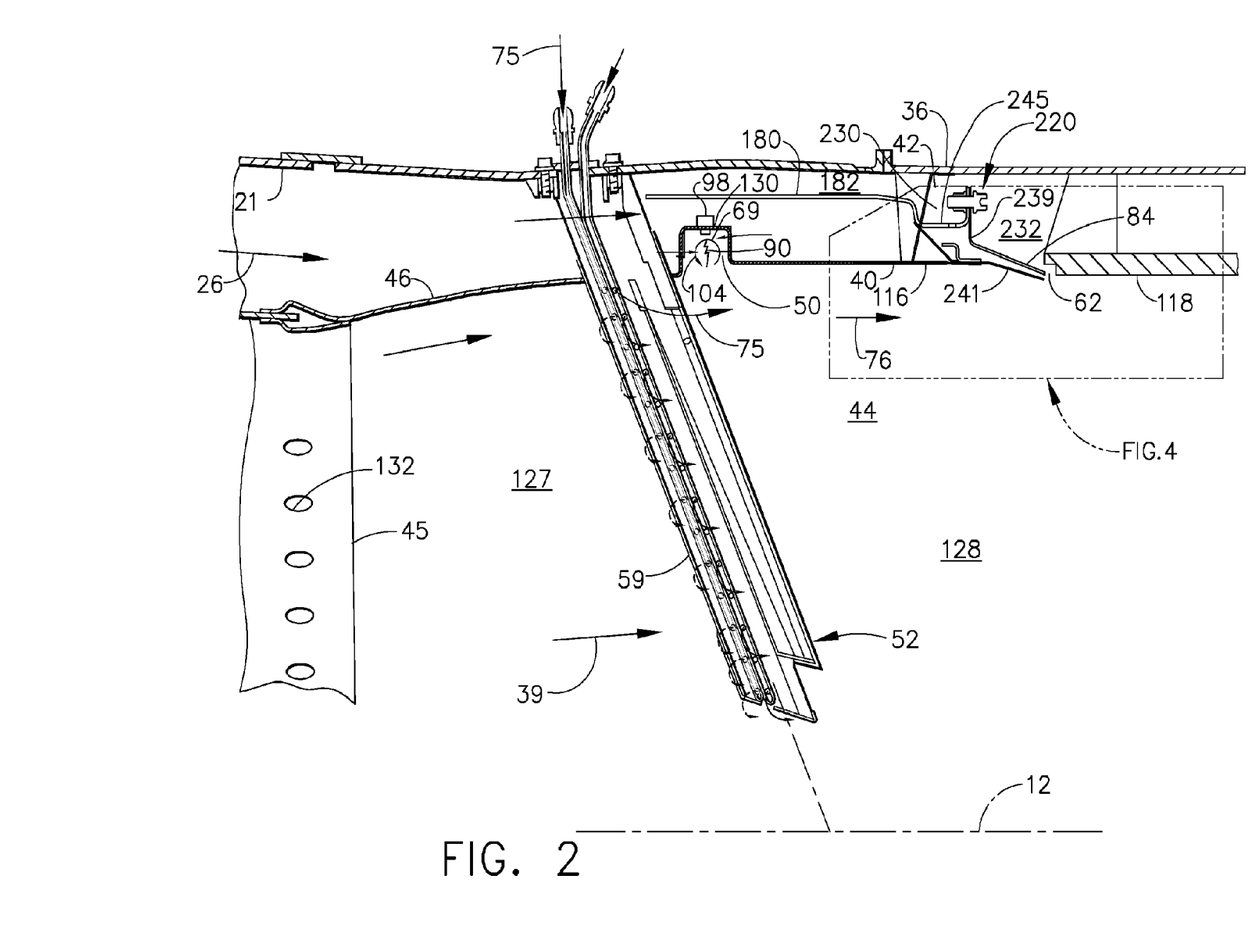
FIG. 2 is an enlarged axial sectional view illustration of the trapped vortex cavity pilot and the ejector and cavity purge assembly illustrated in FIG. 1.

Illustrated in FIGS. 1 and 2 is an exemplary medium bypass ratio turbofan gas turbine engine 10 for powering an aircraft (not shown) in flight. The engine 10 is axisymmetrical about a longitudinal or axial centerline axis 12 and has a fan section 14 upstream of a core engine 13. The core engine 13 includes, in serial downstream flow communication, a multistage axial high pressure compressor 16, an annular combustor 18, and a high pressure turbine 20 suitably joined to the high pressure compressor 16 by a high pressure drive shaft 17. Downstream of the core engine 13 is a multistage low pressure turbine 22 suitably joined to the fan section 14 by a low pressure drive shaft 19. The core engine 13 is contained within a core engine casing 23 and an annular bypass duct 24 containing a bypass flowpath 25 circumscribed about the core engine 13. An engine casing 21 circumscribes the bypass duct 24 which extends from the fan section 14 downstream past the low pressure turbine 22.

Engine air 31 enters the engine through an engine inlet 11 and is initially pressurized as it flows downstream through the fan section 14 with an inner portion thereof referred to as core engine air 37 flowing through the high pressure compressor 16 for further compression. An outer portion of the engine air is referred to as bypass air 26 and is directed to bypass the core engine 13 and flow through the bypass duct 24. The core engine air is suitably mixed with fuel by main combustor fuel injectors 32 and carburetors in the combustor 18 and ignited for generating hot combustion gases which flow through the turbines 20, 22. The hot combustion gases are discharged through an annular core outlet 30 as core gases 28 into a core stream flowpath 127 which is an upstream portion of an exhaust flowpath 128 extending downstream and aftwardly of the turbines 20, 22 and through a diffuser 29 which is aft and downstream of the turbines 20, 22 in the engine 10. The core stream flowpath 127 is located radially inwardly of the bypass duct 24.

The diffuser 29 includes a diffuser duct 33 circumscribed by an annular radially outer diffuser liner 46 and is used to decrease the velocity of the core gases 28 as they enter an augmentor 34 located radially within an exhaust casing 36 of the engine aft and downstream of the diffuser 29. The centerline axis 12 is also the centerline axis of the augmentor 34 which is circumferentially disposed around the centerline axis 12. A converging centerbody 48 extending aft from the core outlet 30 and partially into the augmentor 34 radially inwardly bounds the diffuser duct 33. The diffuser 29 is axially spaced apart upstream or forwardly of a forward end 35 of a combustion liner 40 which extends downstream through the exhaust casing 36. The combustion liner 40 is an assembly including an augmentor liner 116 forward and upstream of and in an operably cooperating relationship with a tailpipe liner 118 which extends axially and downstream through the entire exhaust casing 36. An annular trapped vortex cavity pilot 50 is formed in the augmentor liner 116. The annular trapped vortex cavity pilot 50 initiates and propagates a flame around the augmentor to the radial flameholder 52 and in a combustion zone 44 in the exhaust flowpath 128 circumscribed or surrounded by the combustion liner 40.

The combustion zone 44 is located radially inwardly from the bypass duct 24 and downstream and aft of the augmentor 34. The annular exhaust casing 36 disposed co-axially with and suitably attached to the corresponding engine casing 21. The exhaust section 126 further includes an annular cooling duct 42 radially disposed between the annular exhaust combustion liner 40 and the exhaust casing 36. The annular cooling duct 42 is disposed in flow communication with the bypass duct 24 for receiving a second portion 27 of the bypass air 26 therefrom.

Referring to FIGS. 1 and 2, exhaust vanes 45 extend radially across the exhaust flowpath 128. The exhaust vanes 45 are typically hollow and curved. The hollow exhaust vanes 45 are designed to receive a first portion 15 of the bypass air 26 and flow it into the exhaust flowpath 128 through air injection holes 132. The bypass air 26 and the core gases 28 mix together to form an exhaust flow 39. Mounted to the aft end of the exhaust casing 36 is a variable area converging-diverging exhaust nozzle 38 through which the exhaust flow 39 are discharged during operation.

Figure 3:
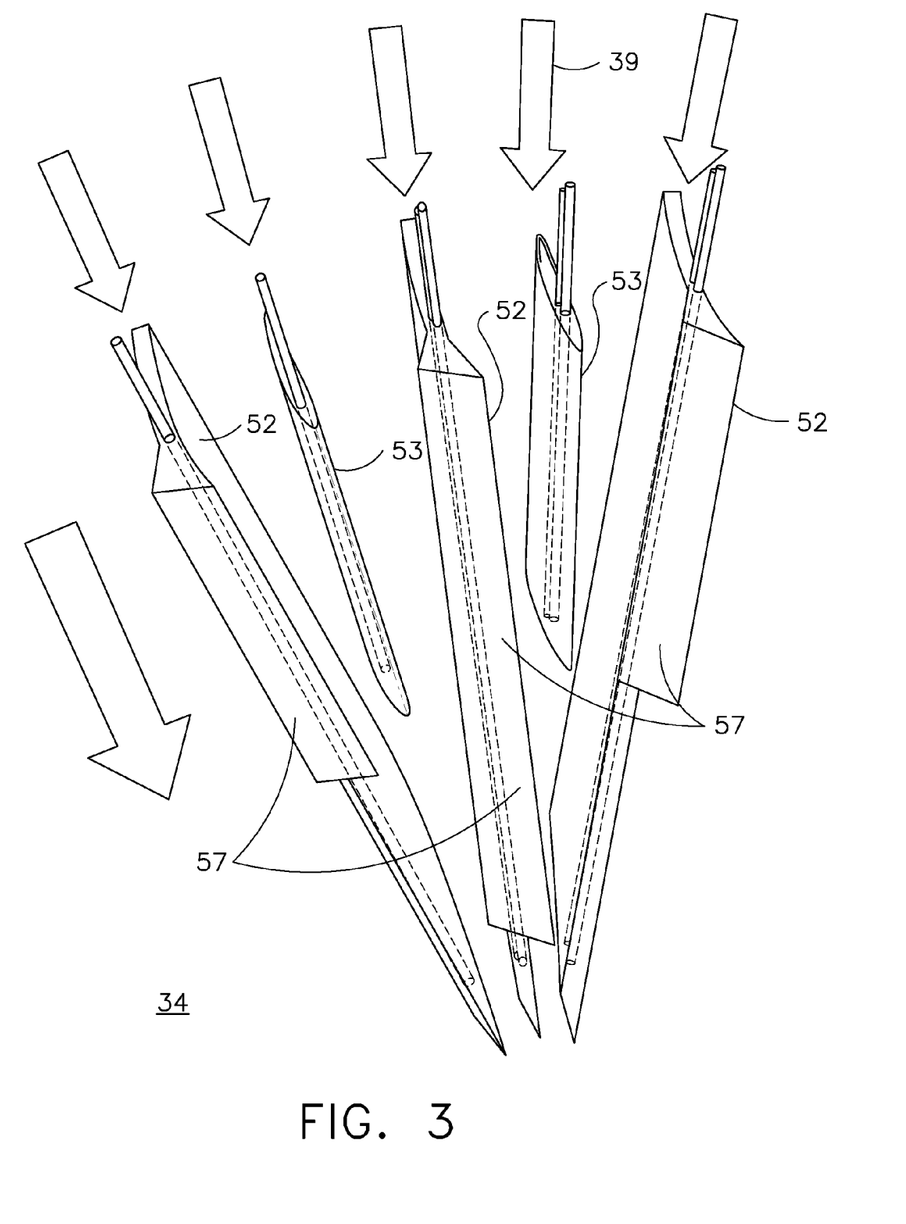
FIG. 3 is a perspective view illustration of a portion of radial spraybars disposed between radial flameholders in the augmentor illustrated in FIG. 1.

The exemplary embodiment of the augmentor 34 illustrated herein includes a plurality of circumferentially spaced apart radial flameholders 52 extending radially inwardly from the outer diffuser liner 46 into the exhaust flowpath 128. The radial flameholders 52 include integral fuel spraybars 59 and are circumferentially interdigitated with radial spraybars 53 as illustrated in FIG. 3 and disclosed in US Patent Application No. 2009/0056340, entitled "Augmentor With Trapped Vortex Cavity Pilot", now U.S. Pat. No. 8,011,188, by Ivan Elmer Woltmann, filed Aug. 31, 2007, assigned to the present Assignee and incorporated herein by reference.

Referring to FIGS. 1-3, the radial flameholders 52 are circumferentially interdigitated with radial spraybars 53, i.e. one radial spray bar 53 between each circumferentially adjacent pair 57 of the radial flameholders 52. The radial spraybars 53 and the integral fuel spraybars 59 are operable for injecting fuel 75 into the exhaust flowpath 128. The first portion 15 of the bypass air 26 mixes with core gases 28 in the exhaust flowpath 128 to form the exhaust flow 39 and further downstream other portions of the bypass air 26 are added to the exhaust flow 39. The augmentor 34 uses the oxygen in the exhaust flowpath 128 for combustion. Fuel 75 from the radial spraybars and from the integral fuel spraybars in the radial flameholders 52 inject the fuel 75 into the exhaust flowpath 128 downstream of the exhaust vanes 45 forming an fuel/air mixture 76 for combustion in the combustion zone 44. The fuel 75 is combusted in the combustion zone 44 for thrust augmentation from the exhaust nozzle 38.

As illustrated herein, the fuel/air mixture 76 is ignited and stabilized by an externally fueled annular trapped vortex cavity pilot 50 illustrated in FIGS. 1 and 2. A plurality of cavity fuel injector tubes 103 disposed around the annular trapped vortex cavity pilot 50 are operably disposed through the outer wall 130 into the trapped vortex cavity pilot 50 for supplying substantially all of the fuel needed for the trapped vortex cavity pilot 50 to function as a pilot to ignite the fuel/air mixture 76 in the combustion zone 44. Alternatively, the cavity may be fueled externally fuel by drawing in fuel/air mixture from the exhaust flow as described in U.S. Pat. No. 7,467,518 entitled "Externally Fueled Trapped Vortex Cavity Augmentor". At least one igniter 98 is operably disposed within the trapped vortex cavity pilot 50 for igniting a fuel and air mixture in vortex cavity which then expands into the combustion zone 44 igniting the fuel and air mixture therein. Only one igniter is illustrated herein but more than one may be used.

If the annular trapped vortex cavity pilot 50 is externally fueled, then cavity fuel injector tubes 103 illustrated in phantom lines are located upstream, with respect to the counterclockwise rotational direction 104 of the annular rotating vortex 69, of the igniter(s) 98 and operably located to spray fuel 75 so that it will be entrained in the vortex 69 and pass through a spark 90 for ignition from the igniter 98. The cavity fuel injector tubes 103 include fuel holes located inside the trapped vortex cavity pilot 50 and aimed or oriented to spray fuel circumferentially around the trapped vortex cavity pilot 50 with respect to the axial centerline axis 12 for good fuel dispersion and flame propagation. The one or more igniters 98 are downstream of the cavity fuel injector tubes 103 with respect to the rotating vortex 69 of the fuel and air mixture and the cavity fuel injector tubes 103 are axially aft of the one or more igniters 98.

Figure 4:
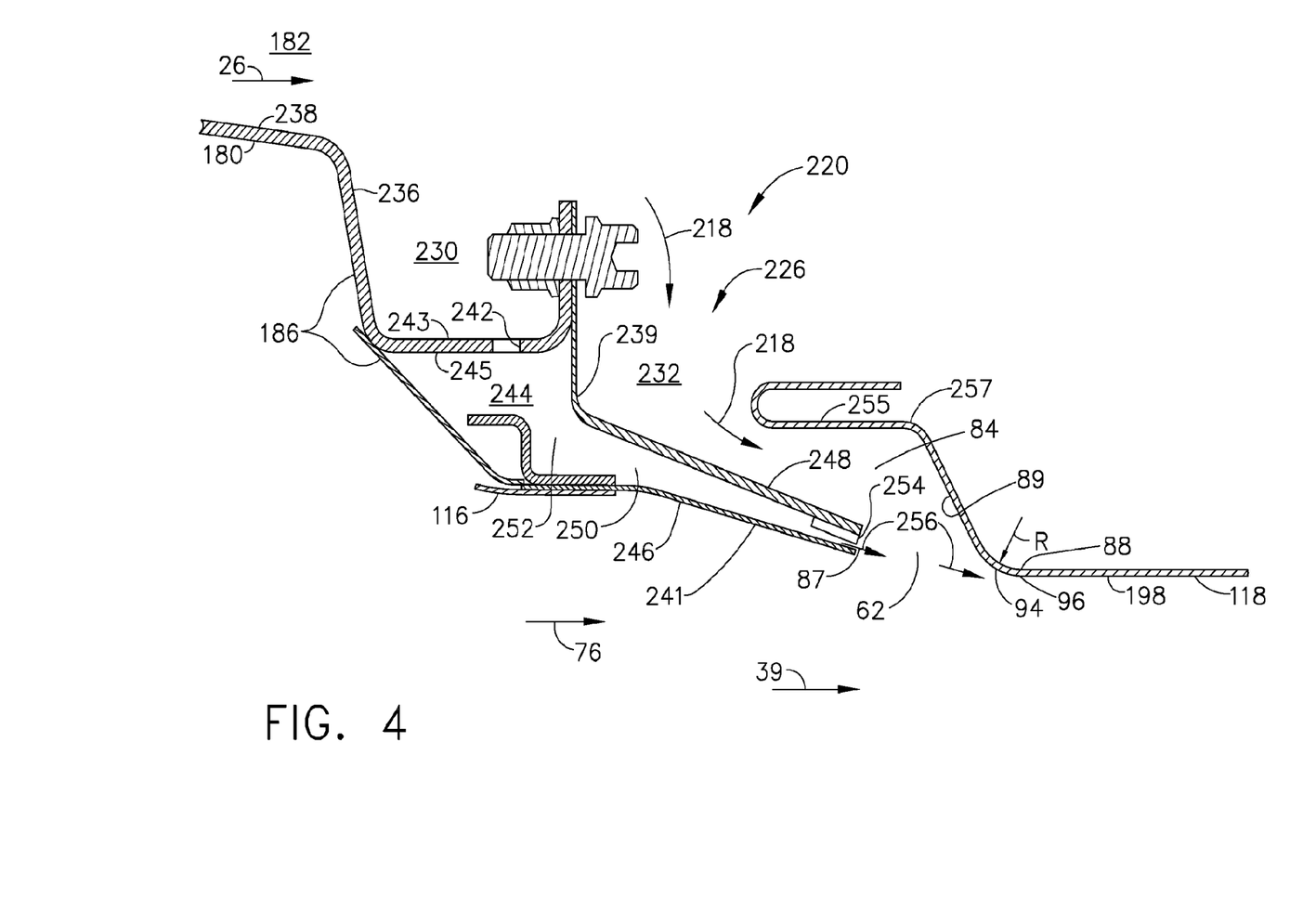
FIG. 4 is an enlarged axial sectional view illustration of the ejector and cavity purge assembly illustrated in FIG. 2.

Referring to FIGS. 1, 2 and 4, an axially extending annular gap 62 is disposed between the augmentor and tailpipe liners 116, 118. The augmentor liner 116 may be made integral with the diffuser liner 46. The gap 62 provides an opening for an inter-liner cavity 84 which separates the augmentor and tailpipe liners 116, 118. The gap 62 is a point of ingestion of fuel/air mixture 76 and hot air combustion gases. Ejector flow 87 and purge flow 218 are used counter or prevent the ingestion. Unburned portions of the fuel/air mixture 76 can also burn around the cavity. The inter-liner cavity 84 can cause flow separation and therefore create a flame-holding region and burning of the augmentor and tailpipe liners 116, 118 in this area which can lead to premature wear or failure and can pose a flight safety hazard.

As Illustrated in FIG. 4, at an upstream end 88 of the tailpipe liner 118 is a forward facing step 89 with respect to the exhaust flow 39. It is possible for potentially fuel-laden exhaust flow 39 to enter the inter-liner cavity 84 due to its size combined with the forward facing step 89. This can cause over-temperaturing in the area of the inter-liner cavity 84. The flame-holding capability of the inter-liner cavity 84 and the forward facing step 89 is a durability and flight safety concern. An ejector and cavity purge assembly 220, including a purge flow cavity 226 and a flow ejector 239, is provided to prevent fuel-laden exhaust flow 39 from entering the inter-liner cavity 84.

The purge flow cavity 226 provides purge flow 218 to the inter-liner cavity 84 and is designed to prevent fuel-laden exhaust flow 39 from entering the inter-liner cavity 84 and to prevent the forward facing step 89 from holding a flame. The purge flow cavity 226 is open to the bypass air 26 and is located radially outwardly of and in fluid flow communication with the inter-liner cavity 84. The purge flow 218 is channeled from the bypass air 26 through the purge flow cavity 226, into the inter-liner cavity 84, and then out of the inter-liner cavity 84 through the gap 62.

An annular bifurcating duct wall 180 bifurcates the annular bypass duct 24 into annular radially outer and inner fan ducts 182, 184. The purge flow cavity 226 is bifurcated into forward and aft purge flow cavities 230, 232 by a U-shaped wall 236 formed at an aft or downstream end 238 of the bifurcating duct wall 180. The forward and aft purge flow cavities 230, 232 are radially outwardly open and in flow communication with the outer fan duct 182 of the bypass duct 24. The ejector 239 includes an ejector plenum 244 bounded in part by a radially annular inner section 243 of the U-shaped wall 236 and serves as an annular dividing wall 245 having ejector metering apertures 242 therethrough. The inner section 243 of the U-shaped wall 236 is located between the forward purge flow cavity 230 and the ejector plenum 244 and the ejector plenum 244 is located radially inwardly of the forward purge flow cavity 230 and the inner section 243. The ejector metering apertures 242 meter cooling air from the forward purge flow cavity 230 to the ejector plenum 244. The inner fan duct 184 is aftwardly bounded and truncated by an inner fan duct wall 186 which axially forwardly bounds or seals the ejector plenum 244.

The ejector 239 further includes an annular ejector nozzle 241 radially bounded by radially spaced apart ejector inner and outer walls 246, 248 and a convergent nozzle flowpath 250 therebetween. The nozzle flowpath 250 extends and converges aftwardly from an ejector nozzle inlet 252 to an ejector nozzle outlet 254. The ejector nozzle inlet 252 is open to the ejector plenum 244 and the ejector nozzle outlet 254 is positioned and aimed to direct an ejector nozzle flow 256 from inside the ejector nozzle 241 across the inter-liner cavity 84 and at the forward facing step 89.

The ejector nozzle 241 directs the ejector nozzle flow 256 aimed at the forward facing step 89 and also draws cooling air from the aft purge flow cavity 232 into the ejector nozzle flow 256 because the static pressure of the ejector nozzle flow 256 exiting the ejector nozzle outlet 254 is lower than the static pressure of the cooling air inside the aft purge flow cavity 232. This has the effect of drawing more cooling air into the aft purge flow cavity 232 to prevent injection of hot fuel laden gases into the cavity and it provides better protection of the forward facing step 89 and a radially inner corner 94 of the forward facing step 89 to prevent flame holding in this area. The corner 94 is rounded having a radius of curvature R and a tangency point 96 with an annular radially inner hot surface 198 of the tailpipe liner 118. An annular lip 255 on a forward or upstream end 257 of the annular tailpipe liner 118 is radially spaced outwardly of and apart from and partially overlaps the annular ejector nozzle 241. The forward facing step 89 radially extends between the lip 255 and the hot surface 198 of the tailpipe liner 118. In a more particular embodiment of the ejector nozzle 241, the ejector nozzle outlet 254 is aimed at the corner 94 of the forward facing step 89 and the tailpipe liner 118. The ejector nozzle 241 is constructed and aimed to allow the ejector nozzle flow 256 to attach at or near the tangency point 96.

Figure 5:
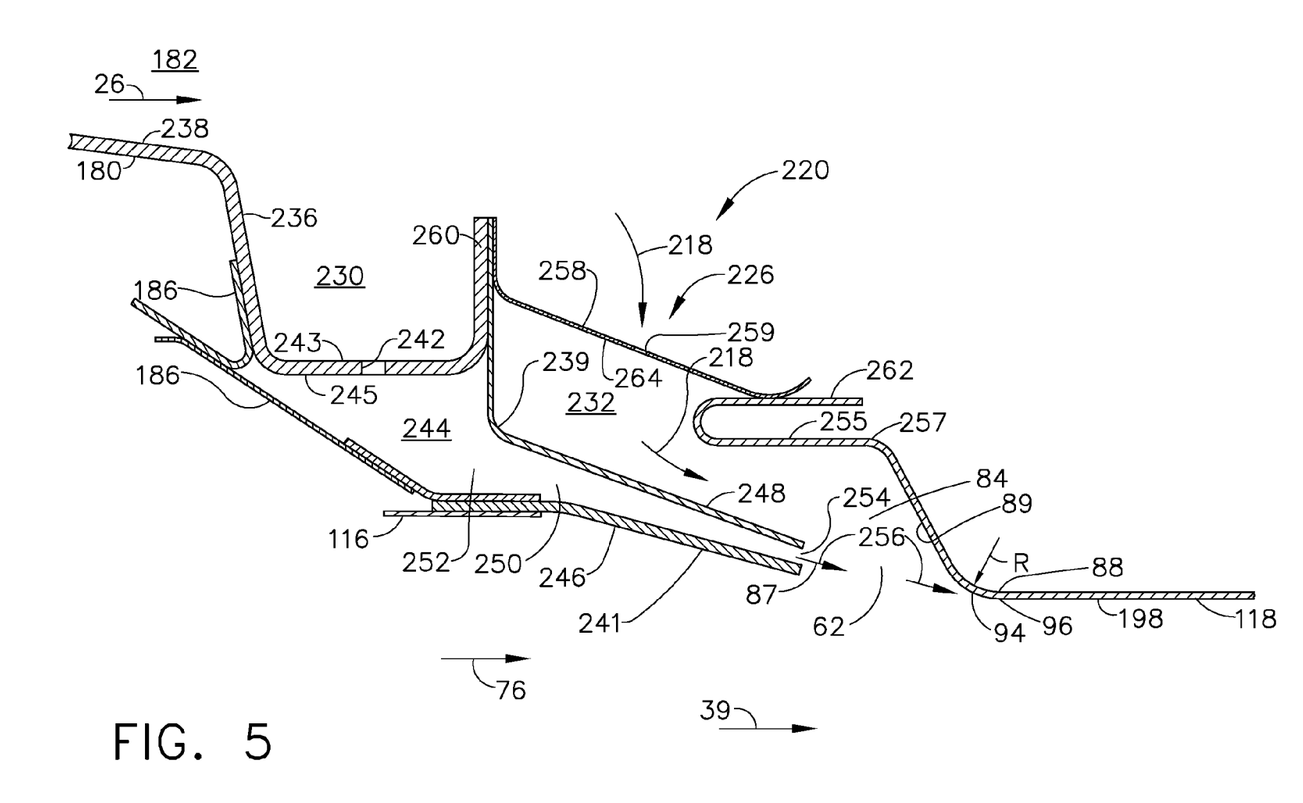
FIG. 5 is an enlarged axial sectional view illustration of an alternative embodiment of the injector and enjector cavity purge assembly illustrated in FIG. 4.

An alternative embodiment of the aft purge flow cavity 232 is illustrated in FIG. 5. The aft purge flow cavity 232 is radially outwardly bounded by an annular radially outer aft purge flow cavity seal 258 having an annular array of purge metering apertures 259 disposed therethrough. The purge metering apertures 259 meter cooling air from the outer fan duct 182 to the aft purge flow cavity 232. The radially outer aft purge flow cavity seal 258 extends axially and converges axially aftwardly between an aft section 260 of the U-shaped wall 236 and a radially outer surface 262 of the lip 255. The cavity seal 258 is flexible and may be a finger seal having an annular array of fingers.

Figure 6:
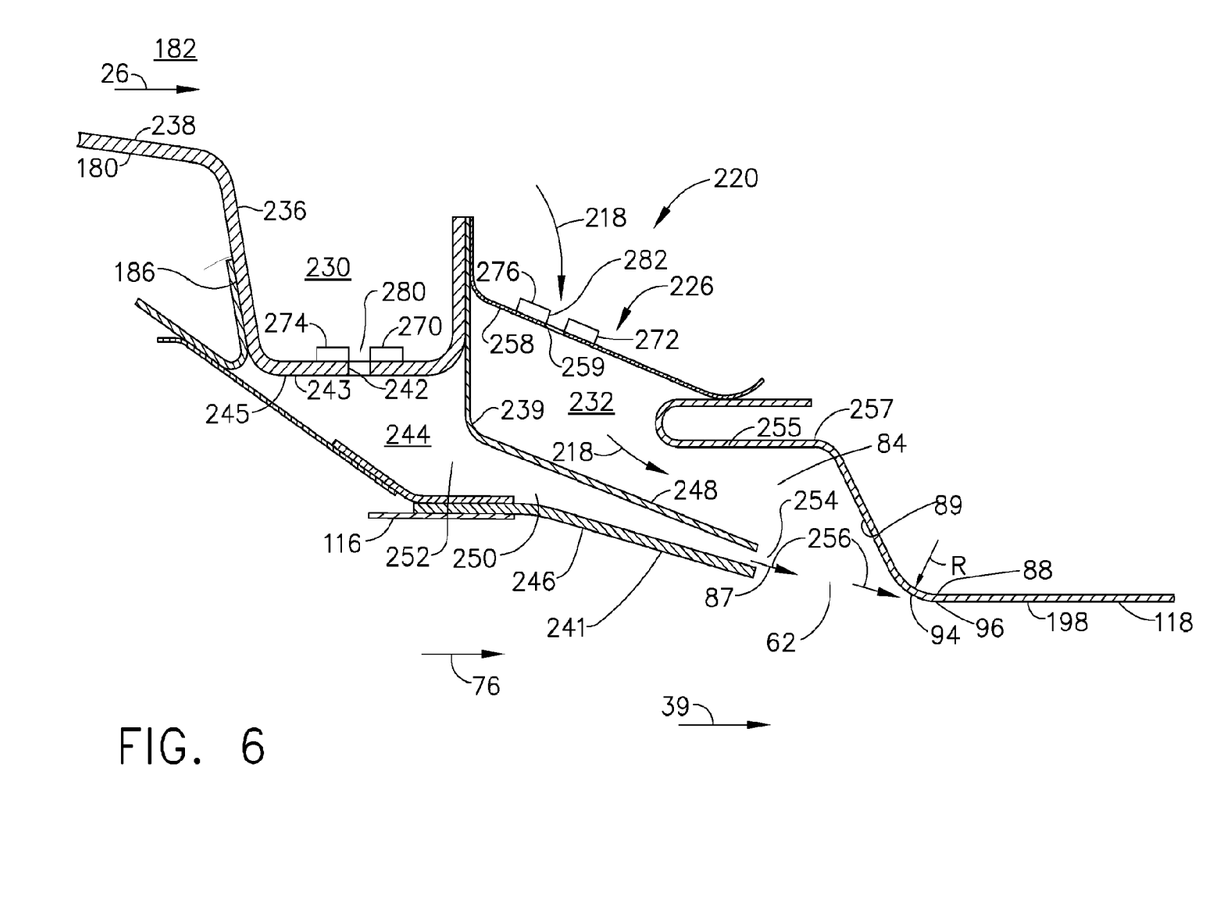
FIG. 6 is a sectional view illustration of a metered alternative embodiment of the ejector and cavity purge assembly illustrated in FIG. 4.

Referring to FIG. 6 the cooling air flowing through the ejector and purge metering apertures 242, 259 may be controlled by ejector and purge valves 270, 272 which are illustrated herein as conical ejector and purge rings 274, 276 having ejector and purge holes 280, 282 respectively. The ejector and purge holes 280, 282 are alignable with the ejector and purge metering apertures 242, 259 by rotating the ejector and purge rings 274, 276 respectively about the centerline axis 12. This allows the amount of cooling air flowing through the ejector and purge metering apertures 242, 259 to be controlled and varied.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. A gas turbine engine augmentor comprising:
    an inter-liner cavity including an axially extending annular gap separating augmentor and tailpipe liners,
    a purge flow cavity radially outwardly open to and in fluid communication with a fan bypass duct and radially inwardly open to and in fluid communication with the inter-liner cavity,
    an ejector having an ejector nozzle positioned and aimed to direct an ejector nozzle flow from inside the ejector nozzle across the inter-liner cavity,
    the ejector nozzle having a nozzle flowpath therein and extending and converging aftwardly between an ejector nozzle inlet to an ejector nozzle outlet,
    the ejector nozzle inlet open to and in fluid communication with an ejector plenum,
    the purge flow cavity bifurcated into forward and aft purge flow cavities open to and in fluid communication with the fan bypass duct,
    the ejector plenum located radially inwardly of and in fluid communication with the forward purge flow cavity,
    the aft purge flow cavity located radially outwardly of and in fluid communication with the inter-liner cavity,
    a U-shaped wall formed at an aft or downstream end of a bifurcating duct wall bifurcating the annular bypass duct into annular radially outer and inner fan ducts, the U-shaped wall bifurcating the purge flow cavity into the forward and aft purge flow cavities, and
    the forward and aft purge flow cavities open to and in fluid communication with the outer fan duct of the fan bypass duct.

2. An augmentor according to claim 1 further comprising an annular dividing wall having ejector metering apertures between the forward purge flow cavity and the ejector plenum.

3. An augmentor according to claim 2 further comprising a forward facing step at an upstream end of the tailpipe liner bordering the annular gap and the ejector nozzle outlet positioned and aimed to further direct the ejector nozzle flow at the forward facing step.

4. An augmentor according to claim 2 further comprising an ejector valve including a conical ejector ring having ejector holes rotatably alignable with the ejector metering apertures.

5. An augmentor according to claim 1 further comprising a forward facing step at an upstream end of the tailpipe liner bordering the annular gap and the ejector nozzle outlet positioned and aimed to further direct the ejector nozzle flow at the forward facing step.

6. An augmentor according to claim 1 further comprising an annular trapped vortex cavity pilot located upstream of the annular gap and operable for initiating and propagating a flame around in a combustion zone in an exhaust flowpath within the augmentor liner.

7. An augmentor according to claim 6 further comprising a forward facing step at an upstream end of the tailpipe liner bordering the annular gap and the ejector nozzle outlet positioned and aimed to further direct the ejector nozzle flow at the forward facing step.

8. An augmentor according to claim 6 further comprising an annular dividing wall having ejector metering apertures between the forward purge flow cavity and the ejector plenum.

9. An augmentor according to claim 8 further comprising a forward facing step at an upstream end of the tailpipe liner bordering the annular gap and the ejector nozzle outlet positioned and aimed to further direct the ejector nozzle flow at the forward facing step.

10. An augmentor according to claim 9 further comprising an ejector valve including a conical ejector ring having ejector holes rotatably alignable with the ejector metering apertures.

11. An augmentor according to claim 10 further comprising
    an ejector valve including a conical ejector ring having ejector holes rotatably alignable with the ejector metering apertures,
    the aft purge flow cavity radially outwardly bounded by an annular radially outer aft purge flow cavity seal having an annular array of purge metering apertures disposed therethrough, and
    a purge valve including a conical purge ring having purge holes rotatably alignable with the purge metering apertures.

12. An augmentor according to claim 1 further comprising the aft purge flow cavity radially outwardly bounded by an annular radially outer aft purge flow cavity seal having an annular array of purge metering apertures disposed therethrough.

13. An augmentor according to claim 12 further comprising a forward facing step at an upstream end of the tailpipe liner bordering the annular gap and the ejector nozzle outlet positioned and aimed to further direct the ejector nozzle flow at the forward facing step.

14. An augmentor according to claim 12 further comprising an annular trapped vortex cavity pilot located upstream of the annular gap and operable for initiating and propagating a flame around in a combustion zone in an exhaust flowpath within the augmentor liner.

15. An augmentor according to claim 12 further comprising
   an annular dividing wall having ejector metering apertures between the forward purge flow cavity and the ejector plenum, and
   an ejector valve including a conical ejector ring having ejector holes rotatably alignable with the ejector metering apertures and a purge valve including a conical purge ring having purge holes rotatably alignable with the purge metering apertures.

16. An augmentor according to claim 12 further comprising an annular dividing wall having ejector metering apertures between the forward purge flow cavity and the ejector plenum.

17. An augmentor according to claim 16 further comprising a forward facing step at an upstream end of the tailpipe liner bordering the annular gap and the ejector nozzle outlet positioned and aimed to further direct the ejector nozzle flow at the forward facing step.

* * * * *

UNITED STATES PATENT AND TRADEMARK OFFICE
CERTIFICATE OF CORRECTION

PATENT NO. : 8,726,670 B2  
APPLICATION NO. : 12/822519  
DATED : May 20, 2014  
INVENTOR(S) : Bachman et al.

Page 1 of 1

It is certified that error appears in the above-identified patent and that said Letters Patent is hereby corrected as shown below:

In the Specification

In Column 3, Line 46, delete "enjector" and insert -- ejector --, therefor.

In the Claims

In Column 8, Line 9, in Claim 1, delete "and aft" and insert -- and the aft --, therefor.

In Column 8, Lines 54-55, in Claim 11, delete "comprising" and insert -- comprising: --, therefor.

In Column 9, Lines 14-15, in Claim 15, delete "comprising" and insert -- comprising: --, therefor.

Signed and Sealed this  
Thirty-first Day of March, 2015

Michelle K. Lee  
*Director of the United States Patent and Trademark Office*